Patented Feb. 28, 1928.

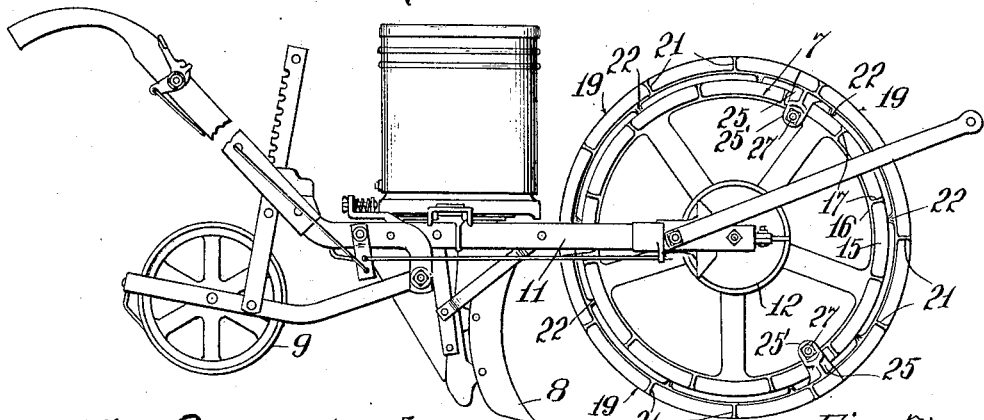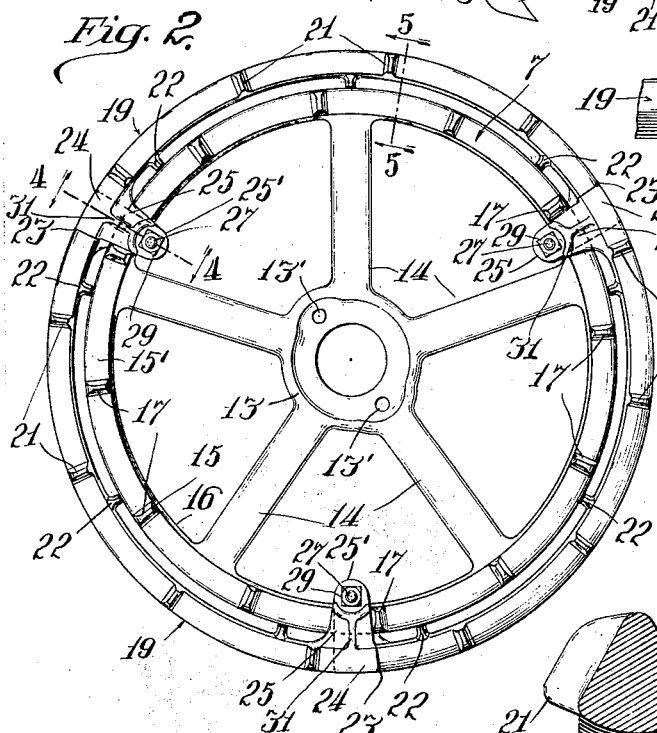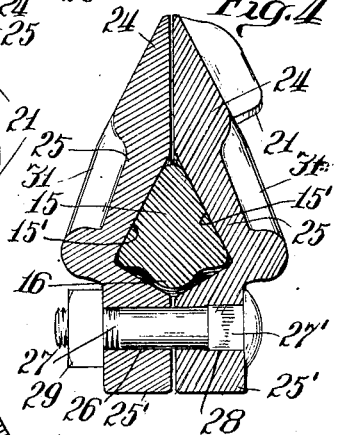

1,660,461

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

EXTENSION RIM FOR THE DRIVE WHEELS OF PLANTERS, ETC.

Application filed October 11, 1926. Serial No. 140,723.

The present invention relates to extension rims for the drive wheels of planters, and other analogous implements.

As is well known to those familiar with planters and other like types of seeding implements, it is the usual practice in such implements to derive the power for operating the seeding mechanism from one of the wheels of the implement, such wheel generally being referred to as the drive wheel. In many instances, it is desirable to increase the effective diameter of this drive wheel so as to obtain a slower rate of seeding or a greater traction efficiency.

It is the fundamental object of the present invention to provide an improved extension rim for mounting on such drive wheel, whereby this greater diameter is obtained. To facilitate mounting the extension rim on the wheel, and to obtain maximum compactness for shipping, storing and handling, it is desirable that the rim be divided into a plurality of sections; and in this regard it is a further object of my invention to provide a sectionalized rim wherein all sections of the rim are duplicate, interchangeable units. In consequence of this, all sections of the rim are made from the same pattern; there are no rights or lefts; and it is impossible to assemble the rim improperly on the drive wheel.

A further object of the invention is to provide improved means for mounting the rim sections on the drive wheel, such being preferably accomplished by providing the rim sections with clamping portions extending therefrom and arranged to embrace the rim or felloe of the drive wheel.

Other objects and advantages of my invention will be apparent from the following detailed description of a preferred embodiment thereof.

In the drawing accompanying this description:

Figure 1 is a side elevational view of a planter, illustrating my improved extension rim mounted on the drive wheel thereof.

Fig. 2 is a similar view of the drive wheel removed and showing the present rim mounted thereon.

Fig. 3 is a fragmentary elevational view of the tread surface of the extension rim, illustrating the overlapping relation between the ends of the rim sections.

Fig. 4 is a transverse sectional view taken on the plane of the line 4—4 of Fig. 2, and Fig. 5 is a transverse sectional view taken on the plane of the line 5—5 of Fig. 2.

For illustrating a typical adaptation of my invention I have shown in Figure 1 a conventional design of one-row planter, comprising a drive wheel 7 and the usual furrow opener 8 and covering wheel 9. The furrow opener and covering wheel are made adjustable, relative to the frame 11, so as to compensate for the greater diameter of the extension rim. The drive from the wheel 7 to the seeding mechanism is in accordance with any standard practice, part of the transmission gearing being generally enclosed in a housing 12 which affords a bearing support for the drive wheel 7.

Fig. 2 illustrates the preferred type of drive wheel to which my extension rim has application. The wheel is cast with the hub 13, the spokes 14 and rim or felloe 15, all integral. The hub 13 is generally recessed on one side and is provided with bolt holes 13' for receiving bolts by which the wheel hub is secured to an inner hub, which in turn carries the bevel gear of the usual power transmission train.

Referring to Figs. 5 and 6, it will be observed that the rim or felloe 15 of the drive wheel is V-shaped in cross section with the apex of the V facing outwardly. The inner periphery of this rim is preferably formed with a shallow bead 16 which merges into the spokes 14. Traction lugs or grousers 17 project outwardly from the inclined side surfaces 15' of the wheel rim, such lugs or grousers preferably alterating between opposite sides of the rim.

The extension rim is divided into a plurality of sections 19, which may be of any desired number, although for the usual size of drive wheel employed on one-row planters I find it preferable to divide this extension rim into three sections. As before described, these sections are all duplicate, interchangeable units, preferably made as castings. In their general formation, such units preferably follow the construction of the wheel rim, being of V-shaped cross section with the apex facing outwardly and with integral lugs or grousers 21 projecting outwardly in alternating sequence from the opposite sloping sides of the rim sections. The inner peripheral surface of each rim section is formed with a plurality of spacing lugs 22 which are adapted to bear on the outer periphery of the wheel rim and space the rim sections therefrom. The ends of the rim sections join with an overlapping joint, as shown in Fig. 3. This joint is obtained by forming in each end of each section a scarf or notch 23 which leaves an extending half portion 24 for forming the joint. In each section, the scarf or notch at one end is located on the right hand side of the section and the scarf or notch at the other end is located on the left hand side of the section. Thus, in assembling the sections on the wheel, these alternating lap portions 24 match at the successive joints and form the overlapping relation between the sections.

Extending radially inwardly from each lap portion 24 is a clamping lug 25. As shown in Fig. 4, each of these clamping lugs slopes outwardly to bear flat against the sloping side surface 15' of the wheel rim, and then inclines inwardly to form the apertured boss 25' extending part way across the inner periphery of the wheel rim. The clamping lugs of adjoining rim sections lie in the same transverse plane, and the alined holes 26 therein receive bolts 27 by which each pair of clamping lugs is drawn into firm engagement with the wheel rim. One lug of each rim section is formed with a square socket or counterbore 28 for receiving the square shank portion 27' of the bolt, this preventing the bolt from turning as the nut 29 is being drawn up. Each clamping lug is reinforced by a radially extending rib 31 and by a semi-circular rib 33. When assembled on the drive wheel, the extension rim is held against slipping circumferentially by the engagement of the clamping lugs 25 with the spokes 14 and with the grousers 17 on the wheel rim.

It will be observed that the construction shown provides a simple and inexpensive extension rim in which all sections are identical, and which can be quickly and easily mounted on the drive wheel through the mere fastening of three bolts.

What I claim as my invention and desire to secure by Letters Patent, is—

1. An extension rim for the drive wheel of a planter or the like, comprising a plurality of duplicate rim sections adapted to aline with each other over the felloe of the wheel, and having lugs extending inwardly from opposite sides of the opposite ends of each of said sections, the lugs of adjoining sections being adapted to embrace the felloe of the drive wheel.

2. An extension rim for the drive wheel of a planter or the like, comprising a plurality of rim sections having inwardly extending lugs at their end portions, the lugs at the adjoining ends of said sections lying at opposite sides of the wheel, and means for securing opposite lugs together to hold the rim on the wheel.

3. An extension rim for the drive wheel of a planter or the like, comprising a plurality of rim sections having end portions adapted to overlap laterally above the felloe of the wheel, and provided with inwardly extending lugs, the lugs at the adjoining ends of said sections lying at opposite sides of the wheel, and means extending transversely under the felloe for securing opposite lugs together to hold the rim on the wheel.

4. An extension rim for the drive wheel of a planter or the like, comprising a plurality of duplicate rim sections adapted to aline with each other over the felloe of the wheel, and having laterally overlapping end portions, and clamping lugs extending inwardly from each of said sections and adapted to embrace the rim of the drive wheel.

CHARLES H. WHITE.